UNITED STATES PATENT OFFICE.

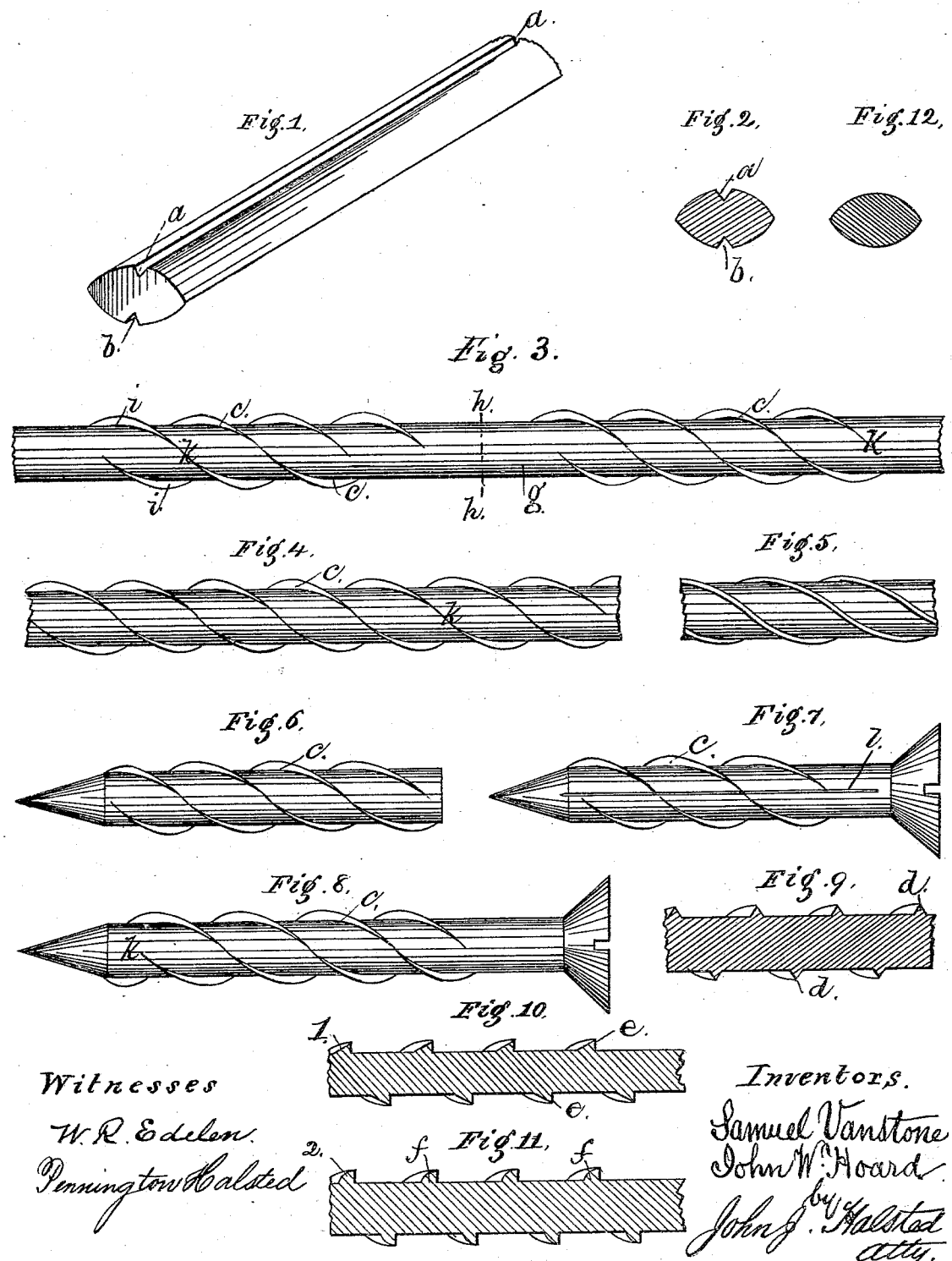

SAMUEL VANSTONE AND JOHN W. HOARD, OF PROVIDENCE, R. I.

IMPROVEMENT IN THE MANUFACTURE OF SCREW-THREADED RODS.

Specification forming part of Letters Patent No. 186,904, dated January 30, 1877; application filed June 26, 1876.

*To all whom it may concern:*

Be it known that we, SAMUEL VANSTONE and JOHN W. HOARD, both of Providence, in the county of Providence and State of Rhode Island, have invented certain new and useful Improvements in the Manufacture of Screws; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Our invention relates to a new process or method of making threaded nails or screws, and it not only dispenses with all cutting of threads, but also with all turning or revolution of the stock to be threaded, and also with all need of cutting off a screw-blank from a rod or coil prior to its being threaded, while at the same time producing a peculiarly-threaded rod, ready to be cut up into threaded nails or screws, and which are adapted to be driven home into the wood by blows.

To effect these and other results hereinafter stated, our invention consists in the production, by endwise rolling a bar or rod between appropriate drawing-rollers, of a continuous rod or wire having thereon a raised thread at such parts as may be desired, such rod, when discharged from the shaping-rolls, being in condition to be cut up into lengths suitable for the size of screw or threaded nail required, and subsequently pointed, and headed if a head be wanted.

We do not use the ordinary short screw-blank, nor make our screw-nails by compressing a groove, or by cutting a groove below the surface of the stock, neither of which methods is adapted for the purposes of our invention.

We may begin with a billet of iron and run it through proper rolls to reduce it to a continuous rod or wire, of a size approximate to that of the cylindrical part of the finished nail or screw, and then run it through specially-shaped rollers adapted to give it a form in cross-section, substantially such as shown in Figures 1 and 2, and having longitudinal depressions or grooves *a b* on the opposite sides of the smaller diameter of the rod, these grooves being for a purpose presently to be stated. We next pass or draw this grooved rod or wire between rollers, which impart to it its ultimate raised threaded character, the entire length of rod or coil being thus threaded as predetermined and required, and ready to be secured into short pieces, each of which becomes a threaded nail or screw. For this purpose the final pair of rolls above referred to are preferably made each with a peripheral groove, semicircular in cross-section, so that, if these two grooves were left entirely smooth, they would in their action roll this rod into a simple cylindrical rod or wire; but as a raised thread is one of the objects sought, we make these grooves with a series of scores or cuts made transversely therein, placed at any desired angle with the groove, and these scores impart to the wire or rod a raised bead or rib, *c*, to serve as the thread of the nail or screw, as shown in Figs. 3 to 11. These raised ribs or threads may be of any desired number, one or more, and of any desired form in their cross-section, as, for instance, inclining equally in both directions, as seen at *d*, or with one side only inclined relatively to the stock or rod, and the other at right angles, or thereabout, to the same, as seen at *e*, or curved at one side, as seen at *f*.

When both sides are equally inclined, the nail may be pointed at either end, and be driven equally well in either direction; but when formed as shown at *e* or *f*. it can be driven only in one direction, viz., that against the less abrupt inclination, as at 1 and 2.

The raised thread need not be continuous throughout the length of a given severed and finished nail, although under our process it may be so made throughout the whole continuous length of the rolled wire or rod; but we prefer that the rod should be left at intervals without such thread, for a space sufficient for the head and point of the completed article, as shown at *g*, in Fig. 3, so that when cut up or severed about centrally of such plain spaces, say at *h h*, to form nails, one unthreaded end may be sharpened to a point, and the other left unchanged, or upset, to form a head, when desired. When not so upset, the expense of heading, slotting the head, and shaving is saved, which is about one-half the cost in the manufacture of the ordinary screws. Our threaded nails are as cheap or cheaper than wrought or even than cut nails. Nor need the raised thread or bead be of uniform character throughout; but we prefer to make it swelling up to its fullest height and breadth on two opposite sides of the stock, as at $i$, and thence gradually tapering down to nothing on two opposite sides—thus having what may be termed crescent-shaped threads, and which are eccentric upon and relatively to the cylindrical stock from which they project, as at $k$. The beads or threads being raised above the surface of the body of the wire or coil, it follows that when a nail of this construction is driven home into the wood there is no danger of splitting when the cylindrical part above the thread enters the wood, as in common screws, and for the reason that such part is of lesser diameter than that through the threads.

The object of the grooves $a\ b$ is as follows: There would be more or less tendency in rolling, as in rolling generally, to leave upon the rolled wire a thin film at the opposite sides, which coincide with the line of junction at which the shaping-rollers touch; hence the grooves are made so that when the grooved rod is passed through the last pair or threading-rolls, its longer diameter is compressed by the rolls, and, in squeezing the whole body, the surplus material not taken to form the raised thread is used to fill up and close this gap or groove. If the body of the stock be a little less than usual, these grooves will not be entirely closed, thus leaving a slight longitudinal slit, $l$, Fig. 7, which may be useful for nails or screws for certain purposes.

Fig. 6 shows a headless and pointed, and Fig. 8 a headed and pointed, threaded nail, made from our rolled wire or rod; and, whether headed or not, nails made by our process are adapted to be driven, unless the threads run too straight around the stock; and they always turn, when driven; but when slotted at the head, a screw-driver may be used if desired. The space between the threads may, in some cases, be made somewhat concave.

We sometimes roll the wire stock with straight longitudinal beads thereon, and subsequently twist the wire, which thus converts the beads into spiral raised threads; but this we reserve as the subject for another application.

It will now be seen that we make our threaded nail or screw not from short bits of ordinary cylindrical wire, but may make it from the billet, and that we form the thread by the very act of forming the continuous wire; that we do not cause the wire to revolve in order to receive its thread; that we do not cut in short lengths until the threading is finished; that our threading is also done before any heading, or pointing, or slotting; that we do not need a succession of machines in order to make a threaded blank; that there is great economy and rapidity in our process; and that it admits of producing such a nail or screw, and with such peculiarities, as has never, so far as we know, been before produced.

Instead of commencing with a billet, we may commence with a continuous piece or coil of cold wire, the subsequent steps being as above set forth.

Although we have mentioned the longitudinal grooves as tending to avoid a film, our threaded wire may be made without such grooving, and any film which may be left on the wire may be readily removed by any simple means.

Fig. 12 shows a cross-section of an ungrooved wire adapted for this purpose, and it may be of other forms in cross-section, adapted to the character of the thread or threads to be raised, and which, as before stated, may be continuous and uniform, and of any desired form in its cross-section. Fig. 5 illustrates a piece of wire having uniform threads raised thereon.

We claim—

1. The improved method of making screw-threaded rods, consisting in rolling the metal to a somewhat oval form, with grooves on two opposite sides, and then passing the same between rolls having semi-cylindrical grooves that are obliquely scored or chased, said scores being such as to produce the spiral thread, as set forth.

2. A screw or screw-blank, having crescent-shaped eccentric threads projecting from a cylindrical stock.

3. A continuous rod for screws or nails, rolled with raised threads thereon, alternating with cylindrical or unthreaded portions, as and for the purpose described.

SAMUEL VANSTONE.
JOHN W. HOARD.

Witnesses:
CHARLES SELDEN,
F. R. GLADDING.